United States Patent
Hahn et al.

(10) Patent No.: US 11,514,918 B2
(45) Date of Patent: Nov. 29, 2022

(54) METHOD FOR PROTECTING BIOMETRIC TEMPLATES, AND A SYSTEM AND METHOD FOR VERIFYING A SPEAKER'S IDENTITY

(71) Applicant: Foundation of the Idiap Research Institute (IDIAP), Martigny (CH)

(72) Inventors: Vedrana Krivokuca Hahn, Martigny (CH); Sébastien Marcel, Martigny (CH)

(73) Assignee: Foundation of the IDIAP Research Institute (IDIAP), Martigny (CH)

(*) Notice: Subject to any disclaimer, the term of this patent is extended or adjusted under 35 U.S.C. 154(b) by 143 days.

(21) Appl. No.: 16/839,018

(22) Filed: Apr. 2, 2020

(65) Prior Publication Data

US 2020/0335107 A1    Oct. 22, 2020

(30) Foreign Application Priority Data

Apr. 3, 2019    (EP) .................................... 19167174

(51) Int. Cl.
    *G10L 17/00*    (2013.01)
    *G06F 21/62*    (2013.01)

(52) U.S. Cl.
    CPC .......... *G10L 17/00* (2013.01); *G06F 21/6245* (2013.01)

(58) Field of Classification Search
    CPC ................ G06F 21/32; G06F 21/6245; G06K 2009/00953; G07C 2209/12; G10L 17/00; G10L 17/06; G10L 17/08
    USPC ....................................................... 704/246
    See application file for complete search history.

(56) References Cited

U.S. PATENT DOCUMENTS

| | | | | |
|---|---|---|---|---|
| 7,269,277 B2* | 9/2007 | Davida | ................ | G07F 7/1008 |
| | | | | 382/117 |
| 7,475,013 B2* | 1/2009 | Rifkin | ..................... | G10L 17/02 |
| | | | | 382/215 |
| 9,343,067 B2* | 5/2016 | Ariyaeeinia | ............ | G10L 17/12 |
| 9,621,342 B2* | 4/2017 | Jakobsson | ............. | H04L 9/0836 |
| 9,916,538 B2* | 3/2018 | Zadeh | .................... | G06K 9/627 |

(Continued)

FOREIGN PATENT DOCUMENTS

| | | |
|---|---|---|
| IN | 03475CH2013 A | 8/2013 |
| WO | WO-2013/121309 A1 | 8/2013 |

OTHER PUBLICATIONS

D. Maltoni, et al., "Securing Fingerprint Systems", Handbook of Fingerprint Recognition, 2009, pp. 371-416.

(Continued)

*Primary Examiner* — Antim G Shah
(74) *Attorney, Agent, or Firm* — Blank Rome LLP

(57) ABSTRACT

A method for protecting a biometric template, comprising the steps of:
retrieving an original vector (V) representing said biometric template, said vector comprising a plurality of original elements ($v_1, v_2, \ldots v_i, \ldots, v_n$);
mapping at least some elements from said original vector to a protected vector (P) comprising a plurality of protected elements ($p_1, p_2, \ldots p_i, \ldots, p_{n-m+1}$), the mapping being based on multivariate polynomials defined by m user-specific coefficients (C) and exponents (E).

13 Claims, 5 Drawing Sheets

(56) References Cited

U.S. PATENT DOCUMENTS

| | | | |
|---|---|---|---|
| 10,181,168 B2* | 1/2019 | Ito | G06F 16/538 |
| 10,419,221 B1* | 9/2019 | Streit | G06F 21/6245 |
| 10,671,735 B2* | 6/2020 | Gupta | G06F 21/46 |
| 10,721,070 B2* | 7/2020 | Streit | H04L 9/008 |
| 10,749,864 B2* | 8/2020 | Garcia Gomar | G10L 17/22 |
| 11,074,495 B2* | 7/2021 | Zadeh | G06K 9/3233 |
| 11,138,333 B2* | 10/2021 | Streit | G06F 21/602 |
| 11,171,785 B2* | 11/2021 | Argones Rua | G06F 21/31 |
| 11,210,375 B2* | 12/2021 | Streit | G06F 21/32 |
| 2002/0070844 A1* | 6/2002 | Davida | G07C 9/37 340/5.53 |
| 2002/0103639 A1* | 8/2002 | Chang | G10L 15/065 704/223 |
| 2004/0225498 A1* | 11/2004 | Rifkin | G10L 17/08 704/250 |
| 2010/0066493 A1* | 3/2010 | Rachlin | G06F 21/32 340/5.82 |
| 2011/0202340 A1* | 8/2011 | Ariyaeeinia | G10L 17/12 704/233 |
| 2014/0201126 A1* | 7/2014 | Zadeh | A61B 5/165 706/52 |
| 2016/0294555 A1* | 10/2016 | Jakobsson | H04L 9/0836 |
| 2017/0109852 A1* | 4/2017 | Ito | G06F 21/32 |
| 2018/0152446 A1* | 5/2018 | Gomar | G10L 17/00 |
| 2018/0204111 A1* | 7/2018 | Zadeh | G06N 3/0436 |
| 2018/0300487 A1* | 10/2018 | Gupta | G06N 5/003 |
| 2019/0278895 A1* | 9/2019 | Streit | G06F 21/602 |
| 2019/0278937 A1* | 9/2019 | Streit | G06F 21/6245 |
| 2019/0279047 A1* | 9/2019 | Streit | G06K 9/00926 |
| 2019/0280868 A1* | 9/2019 | Streit | G06F 21/32 |
| 2019/0280869 A1* | 9/2019 | Streit | H04L 9/3231 |
| 2020/0076604 A1* | 3/2020 | Argones Rua | H04L 9/30 |
| 2020/0335107 A1* | 10/2020 | Hahn | G10L 17/08 |

OTHER PUBLICATIONS

E. Maiorana, et al., "Cancelable Templates for Sequence-Based Biometrics with Application to On-line Signature Recognition", IEEE Transactions on Systems, Man, and Cybernetics—Part A: Systems and Humans; vol. 40, No. 3, May 2010; pp. 525-538.

Anne M. P. Canuto, et al., "An Effective Template Protection method for Face and Voice Cancellable Identification" International Journal of Hybrid intelligent Systems, vol. 11, No. 3, Aug. 2014, pp. 157-166.

M. Damasceno, et al., "Multi-Privacy Biometric Protection Scheme Using Ensemble Systems", IEEE, 2015, 8 pgs.

* cited by examiner

METHOD FOR PROTECTING BIOMETRIC TEMPLATES, AND A SYSTEM AND METHOD FOR VERIFYING A SPEAKER'S IDENTITY

RELATED APPLICATION

This application claims priority of European patent application EP19167174.2, filed on Apr. 3, 2019, the content of which is hereby enclosed by reference.

FIELD OF THE INVENTION

The present invention concerns a method for protecting biometric templates. The present invention also concerns a system and a method for verifying and establishing a speaker's identity.

DESCRIPTION OF RELATED ART

The role of biometrics in the establishment and verification of people's identities is, without a doubt, on the rise. This is particularly evident in our everyday lives, where it has become commonplace to own a mobile device (such as, for example, a phone or laptop) with an integrated biometric authentication system, and we are no longer surprised when call-centre services require us to verify our identities through our voices by speaking to a machine at the other end.

While this is understandable due to the heightened security benefits provided by biometrics versus traditional authentication methods (e.g., passwords and access cards), not to mention the improved convenience, unfortunately this means of authentication or identification is not without its pitfalls. One of the most serious limitations of using biometrics for recognising people is that this involves the collection of personal data that cannot be replaced if it is compromised, due to the permanent link between a person's biometric characteristics and their identity. For example, if someone stole our fingerprint data from a fingerprint recognition system's database, we would not be able to securely use that same fingerprint data elsewhere, which is an issue considering that each person only has a limited number of fingerprints. For this reason, it is important to protect biometric templates when they are collected, transmitted and/or stored in databases.

In the biometrics field, a "template" refers to a set of salient features representing a particular biometric characteristic. For example, a fingerprint template usually consists of the coordinates of certain landmarks called minutiae, a fingervein template may be a binary matrix representing the occurrences of veins in a finger, and so on. The main idea is that the template is a succinct representation of important features that can be used to discriminate between different people's biometrics.

Biometric template protection seeks to establish effective methods for protecting people's biometric templates, for example when they are stored, transmitted or exchanged.

Three broad characteristics can be used to define an ideal biometric template protection method:

1) Accuracy degradation: The incorporation of a biometric template protection scheme into a biometric recognition system should not significantly degrade the system's recognition accuracy.
2) Irreversibility: It should be impossible (or at least computationally expensive or infeasible) to recover the original biometric template from the protected template.
3) Diversity (Cancellability/Unlinkability): It should be possible to generate multiple sufficiently diverse protected templates from the same biometric characteristic, to ensure that: (i) a compromised template can be cancelled and replaced with a new one from the same biometric characteristic, (ii) the same biometric characteristic can be used in multiple applications, without the risk of cross-matching the enrolled templates.

While an ideal biometric template protection scheme should satisfy all three criteria, this is difficult to achieve in practice. There is often a trade-off between the irreversibility and accuracy degradation properties: the more difficult it is to recover the original template from the protected template, the greater the information loss in converting from the original to the protected template, and thus the worse the resulting recognition accuracy. Furthermore, there is no single template protection scheme that is suitable for all biometrics.

There is therefore a need in the prior art for solving those problems, or at least offering a better trade-off, and for improving the biometric template protection.

Existing Voice Template Protection

Various methods have been proposed in the prior art for voice template protection. Four main categories of approaches are known:
cryptographic key generation;
reversible transforms;
irreversible transforms;
hybrid protection schemes.

Voice template protection techniques in the "cryptographic key generation" category aim to extract a set of reliable features (a "key") from a voice template. The biggest challenge with this approach is ensuring that the same key can be generated during enrollment and each authentication attempt. This is difficult due to natural variations across multiple samples of a person's voice, which means that the resulting voice template is likely to be slightly different each time the person presents themselves to the recognition system. Furthermore, key generation template protection schemes generally do not incorporate diversity into the key generation process. This means that a compromised key cannot be replaced with a different key from the same voice template, nor can we use different keys from the same template to enroll into different applications without the risk of being tracked.

Voice template protection schemes in the "reversible transforms" category attempt to protect a person's voice template by modifying it in a user-specific, reversible way. An advantage of reversible transforms is that they apply external information to the voice template (i.e., the transform is user-specific), which increases the amount of discriminative information in the protected template and thus improves the recognition accuracy. The main disadvantage is that the template is protected only insofar as the transform remains secret.

Voice template protection schemes in the "irreversible transforms" category protect a person's voice template, such as a set of spectral features (for example Mel Frequency Cepstral Coefficients or Linear Predictive Coefficients), by mapping this voice template into a different domain, such that it is impossible to uniquely reverse the mapping to recover the original template. The biggest advantage of irreversible transforms is that, even if the mapping is known, the transform is mathematically non-invertible, meaning that the original template should not be recoverable from its protected version. However, existing irreversible transforms usually incur a degradation in recognition accuracy as a result of the information loss that is necessary to achieve an irreversible mapping. For this reason, one must find the optimal balance between the irreversibility of the template and the accuracy degradation of the speaker recognition system. Examples of such methods are described in patent application WO13121309A1 and in US2010066493A.

"Hybrid protection schemes" refer to voice template protection techniques that combine different approaches in an at-tempt to fuse their advantages. A first approach of hybrid protection schemes is based on using the well-known fuzzy commitment scheme along with an additional transform. A second approach employs the popular fuzzy vault scheme together with another transform. An example of a hybrid protection scheme is described in patent application IN03475CH2013A.

It is also known in the prior art to protect biometric voice templates by permuting an i-vector representing the template H times, using H different permutation functions. The first K elements from each permuted i-vector are then selected, and the index of the largest value among each set of K items is recorded. The result is a series of H indices, each of which is secured via a non-invertible, user-specific prime factorisation to generate the protected i-vector. This method is relatively complex.

In another method, i-vectors representing voice templates are secured using homomorphic encryption. The encrypted voice templates remain secure only insofar as the decryption key is kept secret.

BRIEF SUMMARY OF THE INVENTION

It is an aim of the present invention to propose a new biometric template protection method that offers a new trade-off between low accuracy degradation, irreversibility and cancellability/diversity/unlinkability.

It is another aim to propose a new biometric template protection method which is adapted to templates from different biometric modalities.

It is another aim to propose a new biometric template protection which preferably may be adapted to different types of voice templates in the speaker recognition field.

According to the invention, those aims are solved with a method comprising a mapping of sets of elements from an original vector template to a protected vector template via multivariate polynomials defined by a set of user-specific coefficients and exponents.

According to the invention, these aims are achieved by means of a method for protecting a biometric template, comprising the steps of:
  retrieving an original vector representing said biometric template, said vector comprising a plurality of original elements;
  mapping at least some elements from said original vector to a protected vector comprising a plurality of protected elements;
  wherein the mapping is based on multivariate polynomials defined by user-specific coefficients and exponents.

As we will see, this method offers low accuracy degradation (or even improved accuracy), proved irreversibility, and high cancellability/diversity/unlinkability as previously defined.

In particular, according to one aspect a biometric template protection method is proposed that can be used for securing real-number vector-based biometric templates.

The method may be adapted for protecting any real-number vector-based biometric template.

The original vector could be an i-vector.

The original vector could represent a voice biometric template.

The method can thus be used for protecting voice biometric templates represented as i-vectors.

In particular the method can be used for protecting vectors representing voice biometric templates corresponding to speaker models.

The protected vector could be a real-number vector.

This method would fall into the "irreversible transforms" category of voice template protection techniques. It could also be combined with any other method and fall into the "hybrid approach".

The mapping may include overlapping sets of consecutive original elements to single protected elements via multivariate polynomials defined by a set of user-specific coefficients and exponents.

The biometric template that needs to be protected may be represented by an n-dimensional real-number vector $V=[v_1, v_2, \ldots, v_n]$. The mapping involves transforming V to another real-number vector, P, which is the protected version of V. This may be achieved by mapping overlapping sets of consecutive elements from V to single elements in P via multivariate polynomials, which are defined by a set C of m user-specific, ordered, integer coefficients $[c_1, c_2, \ldots, c_m]$ and by a set E of m unique, ordered integer exponents $[e_1, e_2, \ldots, e_m]$, where $1<m<n$. The mapping V→P may be done as follows, for $1 \leq i \leq n-m+1$:

$$p_i = c_1 v_i^{e_1} + c_2 v_{i+1}^{e_2} + \ldots + c_m v_{i+m-1}^{e_m}$$

For example, if m=5, the proposed mapping includes computing protected elements $p_i$ for $1 \leq i \leq n-4$:

$$p_i = c_1 v_i^{e_1} + c_2 v_{i+1}^{e_2} + c_3 v_{i+2}^{e_3} + c_4 v_{i+3}^{e_4} + c_5 v_{i+4}^{e_5}$$

where $C=[c_1, c_2, \ldots, c_5]$ are the input coefficients and $E=[e_1, e_2, \ldots, e_5]$ are the input exponents:

The dimensionality of the protected vector is thus lower than the dimensionality of said original vector.

In particular, the dimensionality of the protected vector, P, is n−m+1.

The step of retrieving the original vector may include receiving a digital signal or recording a signal with a microphone, converting into digital signal, pre-processing, extracting features, and modelling.

The method could be used for the verification or determination of a speaker's identity, based on a speaker's voice sample and a comparison or matching with a protected voice vector previously determined at enrolment.

The matching may include computing a cosine similarity between the protected test biometric vector and the protected enrolment biometric vector.

In this description, the proposed biometric template protection method will be referred to as PolyProtect.

The invention is also related to a method for verifying or establishing a speaker's identity based on his voice. In that case, a test speech sample is retrieved. An original vector V representing biometric features of the speech sample is then determined from said speaker's test speech sample, the original vector comprising a plurality of original elements. A module then maps at least some elements from the original vector to a protected vector comprising a plurality of protected elements, the mapping being based on multivariate polynomials defined by user-specific coefficients and exponents as previously described. The identity of the speaker is established or verified by matching the protected test vector with at least one protected enrolment vector representing a previously determined voice biometric template.

The invention is further related to a system for verifying or establishing a speaker's identity, comprising:
- a module for retrieving a speaker's test speech sample;
- a module arranged for determining from said speaker's test speech sample an original vector representing biometric features of said speech sample, said vector comprising a plurality of original elements;
- a module arranged for mapping at least some elements from said original vector to a protected vector comprising a plurality of protected elements, the mapping being based on multivariate polynomials defined by user-specific coefficients and exponents;
- a module arranged for matching said protected vector with at least one protected vector representing a voice biometric template of the speaker.

The identity is verified or established in case of positive matching.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

We will now describe a biometric template protection method according to the invention, called PolyProtect, for securing biometric templates represented as real-number vectors. The method could be used for protecting voice biometric templates, or any kind of biometric templates that can be represented by real-number vectors V.

An original biometric template can be represented by an n-dimensional real-number vector $V=[v_1, v_2, \ldots, v_n]$. An aim is to map this vector V to another vector, P, where P is the protected version of V. The proposed PolyProtect method is used to achieve this mapping.

This is achieved by mapping overlapping sets of consecutive elements from V to single elements in P via multivariate polynomials defined by a set of user-specific coefficients and exponents.

Let $C=[c_1, c_2, \ldots, c_m]$ represent a set of m ordered integer coefficients and $E=[e_1, e\_2, \ldots, e_m]$ a set of m unique, ordered integer exponents, where $1 < m < n$. C and E may be user-specific.

The mapping V→P is done as follows, for $1 \leq i \leq n-m+1$:

$$p_i = c_1 v_i^{e_1} + c_2 v_{i+1}^{e_2} + \ldots + c_m v_{i+m-1}^{e_m}$$

For example, if m=5 and n≥5, the mapping V→P is done as follows, for $1 \leq i \leq n-4$:

$$P_i = c_1 v_i^{e_1} + c_2 v_{i+1}^{e_2} + c_3 v_{i+2}^{e_3} + c_4 v_{i+3}^{e_4} + c_5 v_{i+4}^{e_5} \quad (1)$$

where $C=[c_1, c_2, \ldots, c_5]$ are the input coefficients and $E=[e_1, e_2, \ldots, e_5]$ are the input exponents:

Note that the dimensionality of the resulting protected vector, P, is n−m+1, where n denotes the dimensionality of the original (unprotected) vector, V, and m denotes the number of user-specific coefficients, C, and exponents, E.

Figure 1:
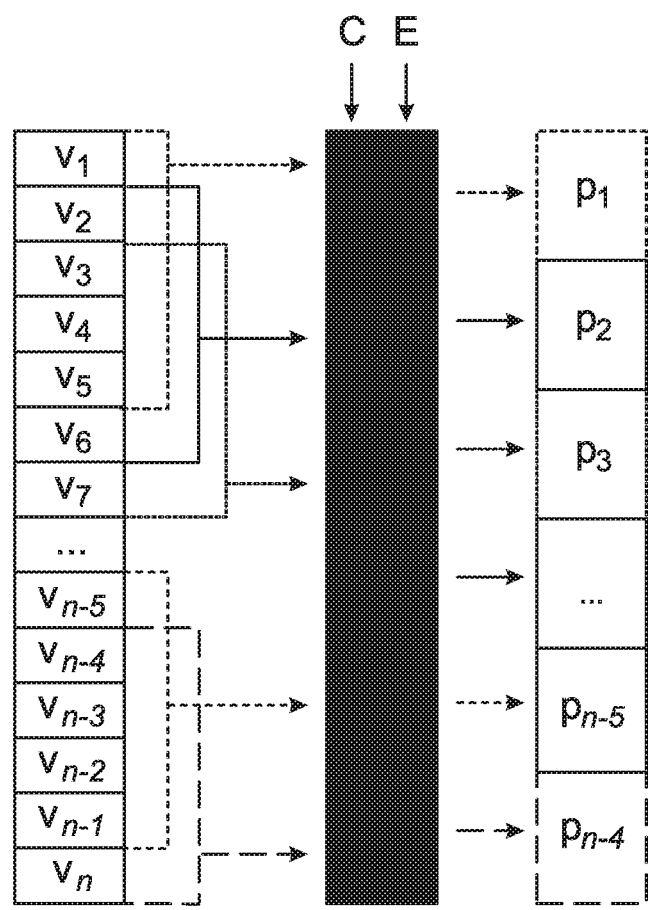
FIG. 1 illustrates the mapping between a real-number vector V and a protected version P of this vector, for m=5, i.e., using 5 user-specific coefficients and exponents.

FIG. 1 illustrates the V→P mapping for m=5. The n dimensional vector V is defined as $V=[v_1; v_2; \ldots; v_n]$ and the protected vector P is an (n−4) dimensional vector defined as $P=[p_1; p_2; \ldots; p_{n-4}]$. The inputs C and E are user-specific coefficients and exponents, respectively, which are used to construct the mapping polynomials used for the transform.

Referring to FIG. 1, element $p_1$ is obtained from elements $v_1, v_2, v_3, v_4$ and $v_5$. This is done using Equation (2), where $C=[c_1, c_2, \ldots, c_5]$ are the input coefficients and $E=[e_1, e_2, \ldots, e_5]$ are the input exponents:

$$P_1 = c_1 v_1^{e_1} + c_2 v_2^{e_2} + c_3 v_3^{e_3} + c_4 v_4^{e_4} + c_5 v_5^{e_5} \quad (2)$$

Similarly, $p_2$ is obtained from elements $v_2, v_3, v_4, v_5$ and $v_6$ via Equation (3):

$$P_2 = c_1 v_2^{e_1} + c_2 v_3^{e_2} + c_3 v_4^{e_3} + c_4 v_5^{e_4} + c_5 v_6^{e_5} \quad (3)$$

The process is continued until $p_{n-4}$ is obtained from elements $v_{n-4}, v_{n-3}, v_{n-2}, v_{n-1}$ and $v_n$ using Equation (4):

$$P_{n-4} = c_1 v_{n-4}^{e_1} + c_2 v_{n-3}^{e_2} + c_3 v_{n-2}^{e_3} + c_4 v_{n-1}^{e_4} + c_5 v_n^{e_5} \quad (4)$$

To compare two protected biometric vectors, $P_1$ and $P_2$, for example a protected test biometric vector with a protected reference biometric vector determined at enrolment, the cosine similarity metric, expressed by Equation (5), can be used. The closer the cosine similarity is to 1, the more similar $P_1$ is to $P_2$.

$$\text{Cosine similarity} = \frac{P_1 \cdot P_2}{\|P_1\| \, \|P_2\|} \quad (5)$$

Other metrics could be used for verifying whether one protected test biometric vector $P_1$ matches one protected reference biometric vector $P_2$ determined for example during enrolment.

This method is suitable for protecting any real-number vector-based biometric template. However, in the remainder of this description we only consider the applicability of this method for protecting voice biometric templates represented as i-vectors.

The PolyProtect method of the present invention should not be confused with the prior art method based on Bloom filters, which has been used for biometric template protection in the prior art. It is very important to understand the important differences between the two methods. The next section presents the Bloom filter approach along with explanations of how it differs from the method of the present invention.

Bloom Filters

Figure 2:
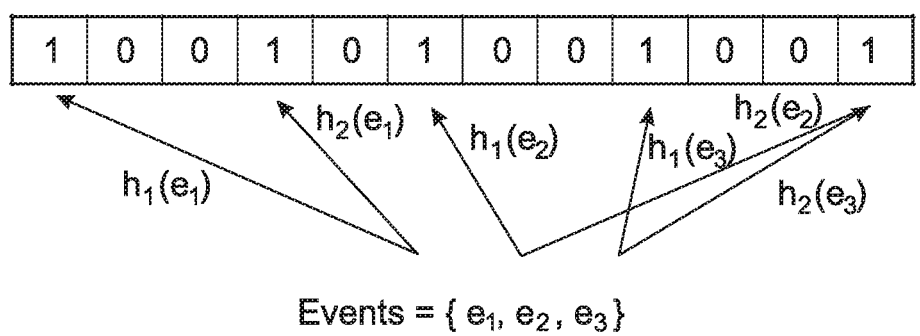
FIG. 2 illustrates an example of a prior art Bloom filter, where the occurrence of an event is marked by mapping it to n locations in the Bloom filter via n hash functions (here, n=2).

A Bloom filter is a space-efficient data structure that tells us whether or not an element is part of a set. The empty Bloom filter is an array of n bits, which are all set to 0. To store an element into the Bloom filter, we apply a number of different hash functions to it. The outputs of the hash functions give indices of the bits in the Bloom filter that should be set to 1. To check whether an element is present in the Bloom filter, the same process is repeated, to verify that all the bits at the indices output by the hash functions are set to 1. A simple Bloom filter is illustrated in FIG. 2, which illustrates how the occurrence of an event is marked by mapping it to n locations in the Bloom filter via n hash functions (here, n=2).

Since different events may map to one or more of the same locations in the Bloom filter (e.g., in FIG. 2, events $e_2$ and $e_3$ map to the same location in the Bloom filter via $h_2$), the mapping is said to be "many-to-one", which means that the reverse mapping is "one-to-many", i.e., one cannot uniquely establish which events are recorded in the Bloom filter simply by looking at which bits have been set to 1. This property makes the Bloom filter a non-invertible data structure. The "non-invertibility" property of Bloom filters has motivated various adaptations to be proposed for biometric template protection.

The PolyProtect method of the invention also involves a mapping of groups of elements from the original biometric template into a new, protected vector. There are a number of important differences between the two approaches, however.

Firstly, Bloom filters work on "sets" of elements, while the PolyProtect method of the invention operates on "vectors". This means that the order of the elements in the input to the Bloom filter mapping does not matter, since anyway this order is not preserved in the resulting Bloom filter. Conversely, the order of the elements in the original biometric template (vector) is important for the PolyProtect mapping, since the mapping works on consecutive groups of elements and this order is preserved in the final, protected vector.

A second difference between Bloom filters and PolyProtect is that the output of the Bloom filter method is a binary vector, whereas the method of the invention produces a real-number vector.

Thirdly, the functions used in the mapping to the Bloom filter are not concretely defined (e.g., one does not know what mapping functions to use), which leaves a lot of room for ambiguity in different implementations. On the other hand, the PolyProtect's mappings of the invention are specifically defined, making it easier to ensure uniformity across multiple implementations of this method.

The PolyProtect method of the present invention is also different from the Fuzzy Vault scheme which has been used for biometric template protection. It is very important to understand the important differences between the two methods. The next section presents the Fuzzy Vault method along with explanations of how it differs from the PolyProtect method of the present invention.

Fuzzy Vault

The Fuzzy Vault scheme works as follows. During enrolment (FIG. 3A), a user's external secret key, K (for example the number sequence 5234) is combined with a user's biometric reference template, T, (for example the minutiae points extracted from his fingerprint) to form a high-order polynomial, P (FIG. 3B) This is denoted as "locking" the vault. For instance, the coefficients of P could be fixed according to K, whereupon P is evaluated at each element of T (the template elements are treated as distinct x-coordinate values). In the example, the numbers 5234 form the coefficients of the polynomial, and the minutiae points constitute the polynomial's x-coordinates.

The polynomial P is evaluated at the minutiae points, and subsequently some noise is added in the form of "chaff points" (FIG. 3D) which are simply random points (FIG. 3D) whose values do not lie on P, to derive the final point set, V (FIG. 3C), which constitutes the fuzzy vault for this particular user. The resulting V is stored in the database as the protected template. The enrolment process in a Fuzzy Vault scheme is illustrated for a fingerprint minutiae template in FIG. 3E, which is taken from Securing Fingerprint Systems. London: Springer, London, 2009, pp. 371-416.

Figure 3:
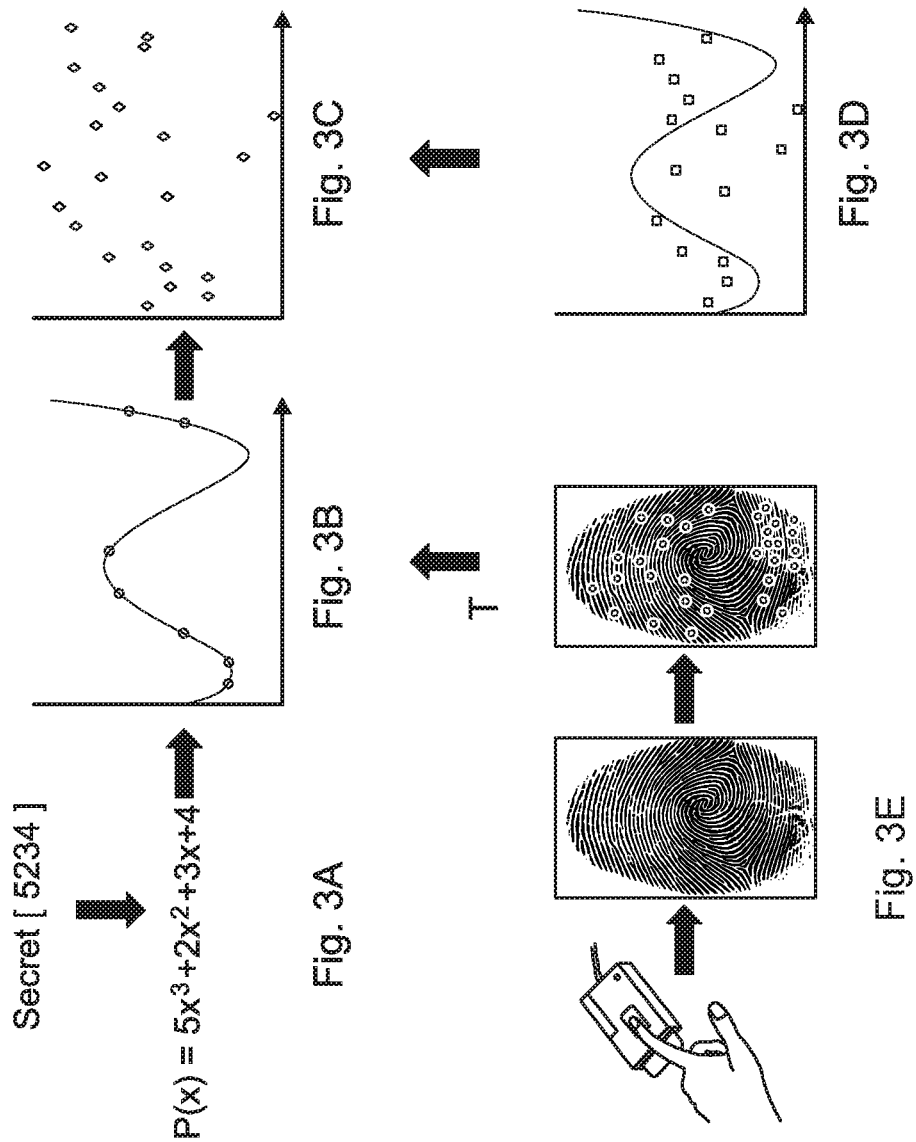
FIGS. 3A-3E illustrates the Fuzzy Vault scheme used for securing fingerprints.
Figure 4:
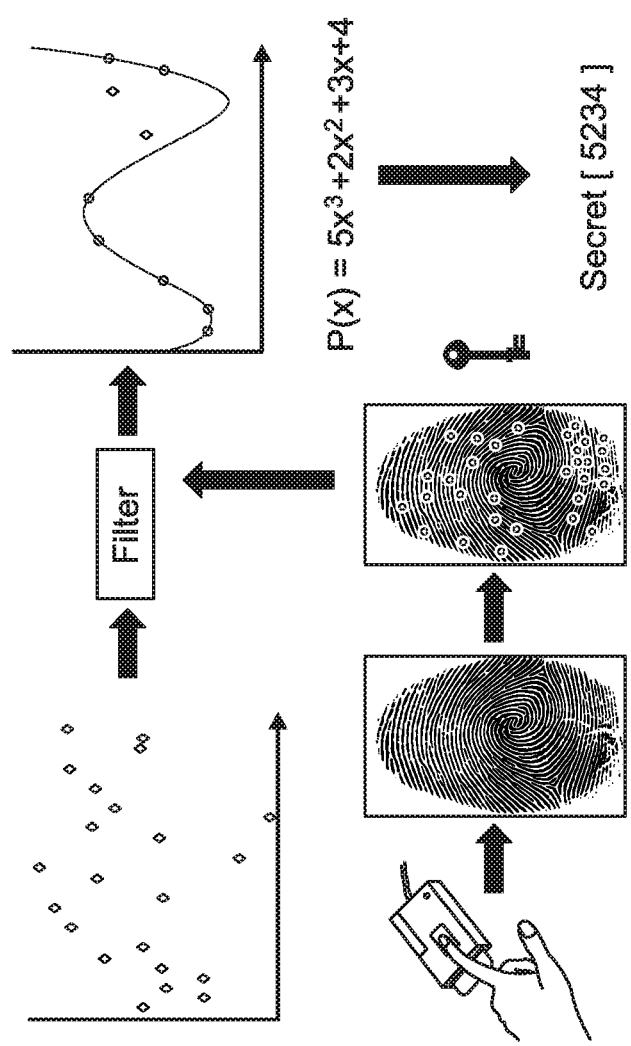
FIG. 4 illustrates the verification process (unlocking the vault) in a fingerprint Fuzzy Vault scheme.

During verification, the fuzzy vault corresponding to the claimed identity is retrieved from a database. A test biometric template, Q (for example a minutiae set), is presented to the recognition system. If the elements of Q are sufficiently similar to the elements of the reference template T (regardless of their ordering) within some error tolerance, then Q can be corrected using error correcting codes to match T, which can then be used to reconstruct P, and thereby obtain K. This is referred to as "unlocking" the vault, which is accomplished via a polynomial reconstruction mechanism. Release of K indicates successful polynomial reconstruction, which signifies a successful verification attempt. If the query minutiae set is similar enough to the minutiae set that was used to construct the fuzzy vault that has been retrieved from the database, then enough true points that lie on the secret polynomial will be identified. In this case, the polynomial will be reconstructed and the user's secret key (5234) will be extracted, thereby signifying a successful verification attempt. The verification process for the Fuzzy Vault scheme from FIG. 3 is illustrated in FIG. 4, taken from the same publication.

The Fuzzy Vault scheme thus uses polynomials to map the original biometric template to the protected template. The main differences with the proposed PolyProtect method are as follows.

Firstly, similarly to the Bloom filter method, the Fuzzy Vault scheme operates on unordered sets of elements, whereas the proposed method relies on an ordered vector.

Secondly, the polynomial used in the Fuzzy Vault scheme is univariate (i.e., each element in the biometric template serves as the input to the polynomial in turn), whereas the proposed polynomials are multivariate (i.e., groups of elements from the biometric template are simultaneously passed to the polynomial).

Thirdly, the proposed PolyProtect method does not necessarily require the addition of "chaff points" to create the protected biometric template, meaning that the PolyProtected template would be smaller than the fuzzy vault template.

i-Vector Biometric Templates

This section presents i-vector voice biometric templates.

There exist a number of different types of templates for representing a person's voice, but the most common technique is to generate a model to characterise the person's way of speaking. A well-known method for modelling a person's voice is Gaussian Mixture Model-Universal Background Model (GMM-UBM). A GMM represents a person's voice characteristics as a sum of weighted Gaussians, each with its own mean and covariance. A UBM is the universal GMM representing the entire population of speakers in the training set of speech samples. A person's unique speaker model is thus generated by adapting their GMM according to the UBM. Usually, only the means of the Gaussians in the speaker's GMM are adapted, and these means are often concatenated to form a supervector, which serves as the speaker's model.

In the simplest sense, an i-vector is a GMM supervector whose dimensionality has been reduced. The reduced dimensionality makes it more practical to apply further processing to improve the recognition accuracy of the resulting speaker models. For example, Linear Discriminant Analysis (LDA) may be applied to i-vectors in an attempt to maximise inter-class variance (i.e., variance across speaker models from different people) while minimising intra-class variance (i.e., variance across different instances of the same person's speaker model).

Figure 5:
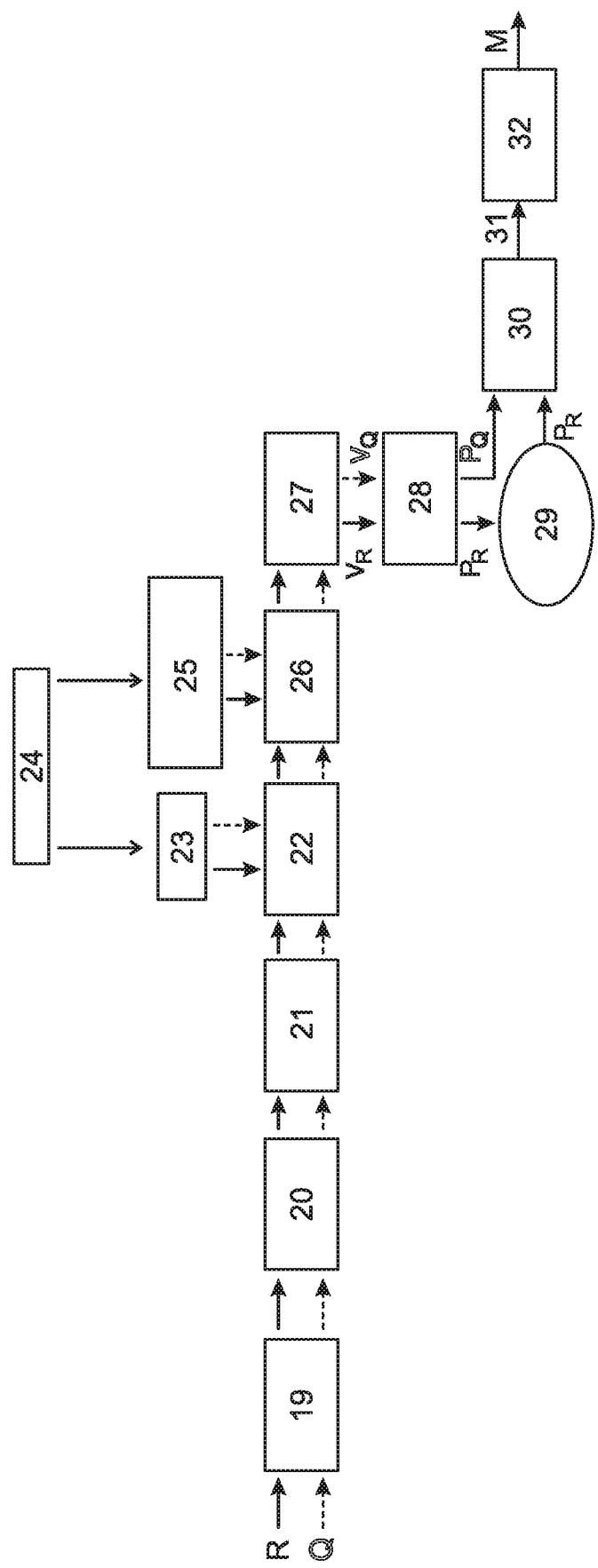
FIG. 5 illustrates an i-vector based speaker recognition system, with which the method of the invention can be executed.

FIG. 5 illustrates an i-vector based speaker recognition system according to the invention. It also shows the enrolment and verification stages in such a system. In this figure, R designates the speech sample acquired during enrolment and $V_R$ denotes the corresponding (unprotected) i-vector, generated from this speech sample. Similarly, Q designates the test speech sample (i.e., the speech sample obtained during verification) and $V_Q$ denotes the corresponding (unprotected) i-vector, generated from this speech sample. The speech samples are retrieved for example using a microphone, A/D converter, and a filter. Furthermore, $P_R$ and $P_Q$ denote the protected versions of $V_R$ and $V_Q$, respectively.

Block 20 designates a pre-processing module or step. Pre-processing involves for example distinguishing speech from noise. Block 21 designates a feature extraction module or step. Feature extraction may for example involve extracting Mel-Frequency Cepstral Coefficients (MFCCs). Block 22 designates a GMM-UBM module or step for modelling a person's voice using for example the Gaussian Mixture Model-Universal Background Model (GMM-UBM) approach. Block 23 designates a Universal Background Modelling module or step, which is performed on training speech samples depicted by Block 24.

Block 25 illustrates the step in which an i-vector projection matrix is calculated on the training speech samples (depicted by Block 24).

Block 26 is an i-vector projection module or step, which determines the original vectors V that represent the voice biometric templates obtained during enrolment and verification.

Block 27 is a post-processing step or module. Post-processing may involve further dimensionality reduction (such as LDA) on the original i-vectors. Block 27 outputs two post-processed vectors $V_R$ and $V_Q$.

The vectors, $V_R$ and $V_Q$ are inputs to Block 28 that performs the PolyProtect transform as previously described. The outputs of Block 28 are the protected vectors $P_R$ and $P_Q$. The vector $P_R$ is both an input and an output to «Protected i-vector Database» Block 29. The output $P_R$ from this database 29, as well as output $P_Q$ from the «PolyProtect-»Block 28 are the input to a «Cosine Similarity Matching» Block 30 that performs a similarity matching, for example a cosine similarity matching, between the reference protected template, $P_R$, and the test protected template, $P_Q$. The matching score is designated with 31. Depending on the score's relation to a pre-defined matching threshold, a decision making Block 32 will decide either that the two protected i-vectors, $P_R$ and $P_Q$, originate from the same person and thus output a decision M indicating that the verification is successful (i.e., "Match"), or that they originate from different people and thus that the verification is not successful (i.e., "No Match").

i-vectors are used to represent voice templates in this method, for two main reasons. Firstly, the vector format of an i-vector is suitable for the proposed template protection technique. Secondly, i-vectors have excellent recognition accuracy. However, other representations of voice or other biometric templates could be considered.

Accuracy Degradation

The accuracy degradation of a biometric template protection scheme refers to the effect (usually negative) that template protection has on the recognition accuracy of the underlying biometric system.

To evaluate the accuracy degradation of PolyProtect on i-vectors, the first step is to extract i-vector templates from a database of speech samples and to establish the baseline performance of the unprotected i-vector recognition system. The performance of the protected i-vector system can then be compared to the performance of the baseline system in terms of a metric such as the Half Total Error Rate (HTER), which is the average of the False Match Rate (FMR) and False Non Match Rate (FNMR). The FMR represents the proportion of impostors mistaken for genuine users, and the FNMR denotes the proportion of genuine users that are mistaken for impostors.

Tests and trials have shown that if the recognition system operates in a normal scenario where each user employs their own set of coefficients and exponents in the generation of their PolyProtected i-vectors most of the time, the recognition accuracy of the protected i-vector system can be expected to be better than the baseline performance (i.e., the recognition accuracy attained by the biometric system when the original, unprotected i-vectors are used). This may be attributed to the user-specific coefficients and exponents, which incorporate additional information into each person's protected template, thereby resulting in greater separation between the protected i-vectors of different people. The PolyProtected system should realistically operate in the normal scenario most of the time.

Tests and trials have also been conducted for the recognition accuracy of the protected i-vector system in a Stolen Coefficients and Exponents scenario. In this scenario, an attacker steals a genuine user's coefficients and exponents, and uses them with his own i-vector to generate his protected i-vector. It was found that the recognition accuracy in this scenario may, in general, be expected to be worse than that of the baseline, but not drastically so. This is due to the fact that, in this scenario, the additional information provided by the user-specific coefficients and exponents in the above normal scenario is lost, so we are essentially just performing a dimensionality reduction in the mapping of V→P. Consequently, there is less distinguishing information between the PolyProtected i-vectors from different people. This result implies that the user-specific coefficients and exponents are best kept secret; however, even in the worst-case scenario where this data is leaked to an attacker, the performance of the PolyProtected system should still be reasonable enough to ensure that the system can operate fairly securely until new coefficients and exponents are issued to the compromised user.

Irreversibility

A biometric template protection scheme is irreversible, or non-invertible, if it is impossible (or computationally infeasible) to recover the original (unprotected) template from the protected template.

In this section, we show that the mapping V→P is irreversible, such that V→P is mathematically impossible.

Firstly, considering Equations (1) to (4), as well as FIG. 1, we see that there is one polynomial equation per element in P. We also know that, if the dimensionality of V is n, then the dimensionality of P is n−m+1, where m is the number of coefficients and exponents used in the PolyProtect mapping. For example, FIG. 1 illustrates PolyProtect for m=5 (i.e., when 5 user-specific coefficients and exponents are used), so the dimensionality of P is illustrated to be n−4. We may thus conclude that, in general, PolyProtect represents a mapping from an n-dimensional real-number space to an (n−m+1)-dimensional real-number space, where this mapping is defined by m coefficients and m exponents. This results in a system of n−m+1 equations with m−1 degrees of freedom.

Since m>1, then m−1>0, implying that there are infinitely many solutions for the elements in V that could produce the vector P. Consequently, we may deduce that the mapping V→P is non-invertible.

Although the irreversibility is theoretically sound, in practice there will not be an infinite number of solutions for V. This is because V's elements will lie in a specific range and be limited to a specific precision, which will constrain the number of valid solutions.

Cancellability/Diversity/Unlinkability

The proposed template protection scheme also offers good cancellability/diversity/unlinkability properties. Therefore, in the event that a PolyProtected i-vector is compromised, one could simply use a different set of coefficients and exponents to generate a new protected i-vector. Furthermore, one could generate multiple PolyProtected i-vectors from the same person's voice, such that those protected templates could be used across multiple applications without the risk of cross-matching.

Since a user's original i-vector should not be stored in the recognition system database (i.e., only the PolyProtected i-vector should be stored), in the event of compromise we would need to acquire a new sample of the person's voice, from which a new i-vector would be generated. Let $V_1$ denote a person's first i-vector, $P_1$ represent the PolyProtected version of $V_1$, and $C_1$ and $E_1$ denote the coefficients and exponents used to generate $P_1$, respectively. Now, assume that P is compromised in some way, meaning that we must remove it from the database and replace it with a new PolyProtected i-vector from the same person's voice. Alternatively, assume that the person wishes to enroll in a different application, using a different P. To achieve this, we ask the person to present a new sample of their voice, from which an i-vector, $V_2$, is extracted. To protect $V_2$ via PolyProtect, we then generate new coefficients and exponents, $C_2$ and $E_2$, which are used to create the protected template, $P_2$.

Experiments have shown that $P_2$ is likely to be sufficiently different from $P_1$, such that they can effectively be seen as different identities.

The proposed method of protecting biometric templates can be used in a system for verifying a speaker's identity based on his voice. In this case, with reference to FIG. 5, a test speech sample Q is retrieved by module 19, for example received over a network, or retrieved using a microphone and A/D converter. The already described blocks (modules) 20-27 are then used for determining from said speaker's test speech sample Q an i-vector $V_Q=(v_1, v_2, \ldots v_i, \ldots, v_n)$. Block 28 then maps at least some elements from said original vector to a protected vector $P_Q$ comprising a plurality of protected elements $(p_i, p_2, \ldots p_i, \ldots, p_{n-m+1})$, the mapping being based on multivariate polynomials defined by m user-specific coefficients (C) and exponents (E) as previously described. The identity of the speaker is then determined or verified by matching the protected test biometric vector with at least one protected reference vector, $P_R$, representing a previously determined voice biometric template of the speaker or of other candidate speakers. The protected reference vectors can be stored in a database.

The module arranged for determining from said speaker's test speech sample an original vector (V) may comprise a processor and a memory comprising a software code portion.

Additional Features and Terminology

Although examples provided herein may be described in the context of a speaker recognition system and method, one or more features may further apply to other types of biometric methods and systems, based on different types of biometric representations of a user. For example, certain aspects of the proposed method can be used to enhance the protection of biometric vectors corresponding to, potentially, fingerprints, veins, iris, gait, etc. characteristics of a user.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for instance, through multi-threaded processing, interrupt processing, or multiple processors or processor cores or on other parallel architectures, rather than sequentially. In addition, different tasks or processes can be performed by different machines or computing systems that can function together.

The various illustrative logical blocks, modules, and algorithm steps described herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, a microprocessor, a state machine, a digital signal processor (DSP), an application specific integrated circuit (ASIC), a FPGA, or other programmable logic device, discrete gate or transistor logic, discrete hardware components, or any combination thereof designed to perform the functions described herein. A hardware processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The invention claimed is:

1. A method for protecting a biometric template, said biometric template being a set of salient features representing a particular biometric characteristic of an individual, comprising the steps of:
retrieving an original vector representing said biometric template, said original vector comprising n original elements, each original element being a real number, wherein said step of retrieving comprises recording with a microphone, converting into digital signal, pre-processing, extracting features, and modelling;
mapping at least some original elements from said original vector to a protected vector comprising a plurality of n-m+1 protected elements, each protected element being a real-number;
said mapping being based on multivariate polynomials defined by a number m of user-specific coefficients and exponents, said multivariate polynomials being of the form:

$$p_i = c_1 v_i^{e_1} + c_2 v_{i+1}^{e_2} + \ldots + c_m v_{i+m-1}^{e_m}$$

where m<n is an integer, $1 \leq i \leq n-m+1$, $[c_1, c_2, \ldots, c_m]$ are the user-specific coefficients and $[e_1, e_2, \ldots, e_m]$ are the user-specific exponents.

2. The method of claim 1, wherein said original vector is an i-vector.

3. The method of claim 1, wherein said original vector represents a voice biometric template.

4. The method of claim 1, said step of mapping comprising mapping overlapping sets of consecutive original elements to single protected elements via multivariate polynomials defined by a set comprising a number of user-specific coefficients and exponents.

5. The method of claim 1, wherein the dimensionality of said protected vector is lower than the dimensionality of said original vector.

6. The method of claim 1, said biometric template being a test biometric template, the method further comprising a step of matching said protected vector with a protected reference vector corresponding to an enrolment biometric template.

7. The method of claim 6, said step of matching comprising computing a cosine similarity between said protected vector ($P_Q$) and said protected reference vector.

8. A method for verifying or establishing a speaker's identity, comprising:
retrieving a speaker's test speech sample;
determining from said speaker's test speech sample an original vector representing a biometric template of said speech sample, said original vector comprising n original elements each original element being a real number;
mapping at least some original elements from said original vector to a protected test vector comprising a plurality n-m+1 of protected elements, each protected element being a real-number, the mapping being based on multivariate polynomials defined by a number m of user-specific coefficients and exponents, said multivariate polynomials being of the form:

$$p_i = c_1 v_i^{e_1} + c_2 v_{i+1}^{e_2} + \ldots + c_m v_{i+m-1}^{e_m}$$

where m<n is an integer, $1 \leq i \leq n-m+1$, $[c_1, c_2, \ldots, c_m]$ are the user-specific coefficients and $[e_1, e_2, \ldots, e_m]$ are the user-specific exponents,
matching said protected test vector with at least one protected reference vector representing a voice biometric template.

9. The method of claim 8, said step of retrieving a test speech sample comprising recording with a microphone and converting to a digital signal.

10. The method of claim 9, said step of determining from said speaker's test speech sample an original vector representing biometric features of said speech sample comprising pre-processing said digital signal and extracting features from the pre-processed digital signal.

11. A system for verifying or establishing a speaker's identity, comprising:
a module for retrieving a speaker's test speech sample;
a module arranged for determining from said speaker's test speech sample an original test vector representing a biometric template of said test speech sample, said original test vector comprising n original elements, each original element being a real number;
a module arranged for mapping at least some of the original elements from said original vector to a protected test vector comprising a plurality of m-m+1 protected elements, each protected element being a real-number, the mapping being based on multivariate polynomials defined by a number m of user-specific coefficients and exponents, said multivariate polynomials being of the form:

$$p_i = c_1 v_i^{e_1} + c_2 v_{i+1}^{e_2} + \ldots + c_m v_{i+m-1}^{e_m}$$

where m<n is an integer, $1 \leq i \leq n-m+1$, $[c_1, c_2, \ldots, c_m]$ are the user-specific coefficients and $[e_1, e_2, \ldots, e_m]$ are the user-specific exponents;
a module arranged for matching said protected test vector with at least one protected reference vector representing a voice biometric template.

12. The system of claim 11, said module for retrieving a speaker's test speech sample comprising a microphone.

13. The system of claim 11, said module arranged for determining from said speaker's test speech sample an original vector comprising a processor and a memory comprising a software code portion.

\* \* \* \* \*